US008388738B2

(12) United States Patent
Asprion et al.

(10) Patent No.: US 8,388,738 B2
(45) Date of Patent: Mar. 5, 2013

(54) METHOD FOR REMOVING CARBON DIOXIDE FROM FLUID FLOWS, IN PARTICULAR COMBUSTION EXHAUST GASES

(75) Inventors: Norbert Asprion, Ludwigshafen (DE); Georg Sieder, Bad Dürkheim (DE); Ute Lichtfers, Karlsruhe (DE); Hugo Rafael Garcia Andarcia, Mannheim (DE)

(73) Assignee: BASF SE (DE)

( * ) Notice: Subject to any disclaimer, the term of this patent is extended or adjusted under 35 U.S.C. 154(b) by 375 days.

(21) Appl. No.: 12/741,956

(22) PCT Filed: Nov. 14, 2008

(86) PCT No.: PCT/EP2008/065538
§ 371 (c)(1),
(2), (4) Date: May 7, 2010

(87) PCT Pub. No.: WO2009/063041
PCT Pub. Date: May 22, 2009

(65) Prior Publication Data
US 2010/0236408 A1    Sep. 23, 2010

(30) Foreign Application Priority Data

Nov. 15, 2007 (EP) .................................. 07120820

(51) Int. Cl.
*B01D 53/14* (2006.01)
(52) U.S. Cl. .............................. 95/183; 95/236; 423/228
(58) Field of Classification Search .......................... None
See application file for complete search history.

(56) References Cited

U.S. PATENT DOCUMENTS

| 3,536,726 | A | * | 10/1970 | Fink et al. ...................... 546/335 |
| 3,738,086 | A | * | 6/1973 | Bellisio et al. .................. 95/180 |
| 3,793,434 | A | * | 2/1974 | Leder ............................ 423/223 |
| 4,073,863 | A | | 2/1978 | Giammarco et al. |
| 4,278,646 | A | | 7/1981 | Lynn et al. ..................... 423/226 |
| 4,292,196 | A | | 9/1981 | Homeier et al. |
| 4,400,368 | A | | 8/1983 | Diaz ........................ 423/573 R |
| 4,405,811 | A | | 9/1983 | Stogryn et al. |
| 5,348,714 | A | | 9/1994 | Peytavy et al. |
| 5,373,048 | A | | 12/1994 | Witzeman et al. |
| 6,267,939 | B1 | | 7/2001 | Gemes et al. |
| 6,500,397 | B1 | | 12/2002 | Yoshida et al. |
| 6,939,393 | B2 | | 9/2005 | Asprion |
| 7,255,842 | B1 | * | 8/2007 | Yeh et al. ...................... 423/234 |

(Continued)

FOREIGN PATENT DOCUMENTS
DE    4201921    7/1992
EP    0331788    9/1989
(Continued)

*Primary Examiner* — Duane Smith
*Assistant Examiner* — Pankti Patel
(74) *Attorney, Agent, or Firm* — Novak Druce Connolly Bove + Quigg LLP

(57) ABSTRACT

A process for removing carbon dioxide from a fluid flow, wherein a) the fluid flow is brought into contact with an absorption agent which contains a solution of ammonia and at least one amino carboxylic acid and/or amino sulfonic acid, a charged absorption agent being obtained, and b) the charged absorption agent is regenerated while releasing carbon dioxide. The additional use of the amino carboxylic acid and/or amino sulfonic acid increases the circulation absorption capacity of the absorption agent.

14 Claims, 2 Drawing Sheets

U.S. PATENT DOCUMENTS

| | | | |
|---|---|---|---|
| 7,887,620 B2 | 2/2011 | Asprion | |
| 2004/0036055 A1 | 2/2004 | Asprion et al. | |
| 2005/0002852 A1* | 1/2005 | Karras et al. | 423/514 |
| 2008/0025893 A1 | 1/2008 | Asprion | |
| 2008/0072762 A1* | 3/2008 | Gal | 96/242 |
| 2008/0098892 A1 | 5/2008 | Asprion | |
| 2008/0236390 A1 | 10/2008 | Anders | |
| 2009/0068078 A1 | 3/2009 | Grobys et al. | 423/220 |
| 2009/0199713 A1 | 8/2009 | Asprion et al. | |
| 2009/0211447 A1 | 8/2009 | Lichtfers | |

FOREIGN PATENT DOCUMENTS

| | | |
|---|---|---|
| EP | 0368422 | 5/1990 |
| EP | 0279667 | 9/1995 |
| EP | 0671200 | 9/1995 |
| EP | 0 768 365 | 4/1997 |
| EP | 1 062 999 | 12/2000 |
| EP | 1582250 | 10/2005 |
| GB | 786669 | 11/1957 |
| JP | 08252430 | 1/1996 |
| WO | WO 02/07862 | 1/2002 |
| WO | WO 02/09849 | 2/2002 |
| WO | WO 2004/082809 | 9/2004 |
| WO | WO 2005/044955 | 5/2005 |
| WO | WO 2005/087349 | 9/2005 |
| WO | WO 2005/087350 | 9/2005 |
| WO | WO 2006/022885 | 3/2006 |
| WO | WO 2007/045679 | 4/2007 |
| WO | WO 2007/104800 | 9/2007 |

* cited by examiner

METHOD FOR REMOVING CARBON DIOXIDE FROM FLUID FLOWS, IN PARTICULAR COMBUSTION EXHAUST GASES

CROSS REFERENCE TO RELATED APPLICATIONS

This application is a National Phase filing under 35 U.S.C. §371 of PCT/EP2008/065538 filed Nov. 14, 2008, which claims priority to Patent Application No. 07120820.1, filed in Europe on Nov. 15, 2007. The entire contents of each of the above-applications are incorporated herein by reference.

The present invention relates to a process for removing carbon dioxide from a fluid stream, especially from combustion offgases or flue gases.

The removal of acidic gases, for example $CO_2$, $H_2S$, $SO_2$, $CS_2$, HCN, COS or mercaptans, from fluid streams such as natural gas, refinery gas, synthesis gas, is of significance for various reasons. Carbon dioxide must, for example, be removed from natural gas, since a high concentration of $CO_2$ reduces the calorific value of the gas. In addition, $CO_2$, in conjunction with moisture which is frequently entrained in the fluid streams, can lead to corrosion on lines and fittings. The content of sulfur compounds of natural gas must be reduced by suitable processing measures immediately at the natural gas source, since the sulfur compounds too form acids in the water frequently entrained by the natural gas, which have corrosive action. For the transport of the natural gas in a pipeline, predefined limits of the sulfur-containing impurities must therefore be observed. Furthermore, numerous sulfur compounds are malodorous even in low concentrations, and sulfur dioxide in particular is toxic.

The removal of carbon dioxide from combustion offgases or flue gases is desirable for various reasons, but especially to reduce the emission of carbon dioxide, which is regarded as the main cause of the so-called greenhouse effect.

In many cases, the carbon dioxide released is subsequently compressed and, for example, sent to a pressure tank or a sequestration. For this purpose, it is advantageous to carry out the regeneration of the absorbent at a relatively high pressure. In this way, the carbon dioxide is obtained at a relatively high pressure level. The pressure difference from the pressure level of the pressure tank is comparatively small and a compression stage can be dispensed with under some circumstances. A relatively high pressure in the regeneration causes a relatively high regeneration temperature. The regeneration temperature is limited by the thermal stability of the absorbent. Aqueous ammoniacal solutions are notable for high thermal stability. WO 2006/022885 discloses a process for cleaning combustion offgases, including the removal of $CO_2$. The combustion offgas is cooled by direct contact with cold water. $CO_2$ is removed by scrubbing with an ammoniacal solution or slurry. The laden solution is regenerated by increasing the pressure and the temperature.

Flue gases have very low partial carbon dioxide pressures, since they are generally obtained at a pressure close to atmospheric pressure, and typically comprise from 3 to 15% by volume of carbon dioxide. In order to achieve an effective removal of carbon dioxide, the absorbent must have a high carbon dioxide affinity. On the other hand, the high carbon dioxide affinity has the effect that, in the course of regeneration of the absorbent, the carbon dioxide is generally not driven out completely and the regenerated absorbent has a residual carbon dioxide loading. The cycle capacity available is only the difference between the maximum loadability of the absorbent and the residual loading of the regenerated absorbent.

It is an object of the invention to specify a process which permits substantial removal of carbon dioxide from fluid streams and regeneration of the absorbent at high pressure, and which uses an absorbent with high cycle capacity.

The object is achieved by a process for removing carbon dioxide from a fluid stream, in which
a) the fluid stream is contacted with an absorbent which comprises a solution of ammonia and at least one aminocarboxylic acid and/or aminosulfonic acid to obtain a laden absorbent,
b) the laden absorbent is regenerated with release of carbon dioxide.

Preference is given to cooling the fluid stream before contacting it with the absorbent, preferably to a temperature of from 0 to 20° C., especially from 2 to 10° C.

The fluid stream can be cooled (quenched) by indirect heat exchange, but is preferably cooled by direct contact with an aqueous scrubbing liquid, especially water or condensate. The scrubbing liquid may comprise alkaline substances such as sodium carbonate or ammonium carbonate; however, this is generally not preferred.

For the contacting of the fluid stream, particularly customary wet scrubbers or gas scrubbers are suitable, in which the scrubbing liquid is contacted with the fluid stream in cocurrent or preferably in countercurrent. The scrubbing liquid is preferably circulated and is pumped in circulation, for example through a heat exchanger. The continuous discharge of a substream prevents the accumulation of impurities.

The fluid stream can be cooled in one or more stages, for example scrubbers connected in series.

As a result of this treatment, water vapor is condensed out of the fluid stream, particulate constituents of the fluid stream are precipitated, and water-soluble impurities of the fluid stream, such as sulfur oxides, are scrubbed out at least partly.

The fluid stream, which has optionally been pretreated as described, is contacted with the absorbent in at least one absorption stage, preferably at a temperature of from 0 to 20° C., especially from 2 to 10° C. The lower the temperature, the more carbon dioxide can be absorbed by the absorbent. The low temperature also reduces the vapor pressure of the ammonia and thus substantially prevents it from evaporating into the treated fluid stream. One or more absorption stages can be used.

Apparatus suitable for performing the carbon dioxide absorption includes scrubbing columns, for example columns with random packing, columns with structured packing and tray columns, and/or other absorbers such as membrane contactors, radial flow scrubbers, jet scrubbers, Venturi scrubbers and rotary spray scrubbers. The gas stream is preferably treated with the absorbent in a scrubbing column in countercurrent. The gas stream is generally fed into the lower region and the absorbent into the upper region of the column.

The process is suitable particularly for fluid streams which are obtained at a pressure at or close to ambient pressure. They are preferably contacted with the absorbent at the pressure at which they are obtained, for example at a pressure of from 0.9 to 3 bar (absolute pressure), preferably from 1 to 1.5 bar.

The laden absorbent is regenerated by heating, preferably at a temperature of from 50 to 200° C., especially from 90 to 140° C. The regeneration is effected at elevated pressure, for example a pressure of from 5 to 50 bar (absolute pressure), preferably from 10 to 30 bar.

The regenerated absorbent is recycled into the absorption stage. Before the regenerated absorbent is introduced back into the absorber, it is cooled to a suitable absorption temperature. In order to exploit the energy present in the hot regenerated absorbent, it is preferred to preheat the laden absorbent from the absorber by heat exchange with the hot regenerated absorbent. The heat exchange brings the laden absorbent to a higher temperature, such that a lower energy input is required in the regeneration step.

The carbon dioxide released with high pressure in the regeneration comprises a small amount of water vapor and ammonia, which can be removed by condensation and/or scrubbing.

The absorbent used in the process according to the invention comprises ammonia and at least one aminocarboxylic acid and/or aminosulfonic acid. The molar ratio of ammonia:aminocarboxylic acid and/or aminosulfonic acid is preferably from 0.5 to 6, especially from 0.8 to 2.

The absorbent preferably has an ammonia concentration (as free $NH_3$ or $NH_4^+$ countercation to aminocarboxylic acid and/or aminosulfonic acid anions) of from 1 to 12 mol/l, especially from 3 to 6 mol/l.

The regenerated absorbent preferably has a molar ratio of ammonia:carbon dioxide of more than 1.5; the laden absorbent preferably has a molar ratio of ammonia:carbon dioxide of from 1.0 to 2.0.

The aminocarboxylic acid and/or aminosulfonic acid is present in the aqueous solution in free form (i.e. zwitterionic form) and/or as an ammonium salt. The aqueous solution preferably comprises essentially no metal salt of the aminocarboxylic acid or aminosulfonic acid.

The aqueous solution is preferably essentially free of inorganic basic salts, i.e. it preferably comprises less than about 10% by weight, especially less than about 5% by weight, of inorganic basic salts. Inorganic basic salts are, for example, alkali metal carbonates or hydrogencarbonates or alkaline earth metal carbonates or hydrogencarbonates, such as especially potassium carbonate (potash).

The increase in the cycle absorption capacity through additional use of an aminocarboxylic acid or aminosulfonic acid is thought to be based on the following connections: amino acids are amphoteric compounds. Their acid strength (expressed by the pKa) is temperature-dependent, the amino acids having stronger acidic action at higher temperatures than at lower temperatures. Since the regeneration of the absorbent typically takes place at a higher temperature than the $CO_2$ absorption, the more strongly acidic character of the amino acid supports the release of $CO_2$ from the laden absorbent, as result of which the energy demand required for the regeneration is reduced. At lower temperatures, the amino acids have neutral or only weakly acidic behavior, such that the absorption capacity at lower temperatures is influenced only to a slight degree, if at all.

Aminocarboxylic acids comprise at least one amino group and at least one carboxyl group in their molecular structure. Correspondingly, aminosulfonic acids comprise at least one amino group and at least one sulfonic acid group in their molecular structure. The nitrogen atom of the amino group may be unsubstituted or mono- or disubstituted, for example by $C_1$-$C_4$-alkyl or hydroxy-$C_2$-$C_4$-alkyl groups. Suitable aminocarboxylic acids comprise typically from 2 to 12 carbon atoms, for example from 4 to 12 carbon atoms; suitable aminosulfonic acids comprise from 1 to 6 carbon atoms.

Suitable aminocarboxylic acids are, for example,

α-amino acids such as glycine (aminoacetic acid), N-methylglycine (N-methylaminoacetic acid, sarcosine), N,N-dimethylglycine (dimethylaminoacetic acid), N-ethylglycine, N,N-diethylglycine, N,N-bis(2-hydroxyethyl)glycine (BICINE), alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (2-amino-3-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, serine (2-amino-3-hydroxypropan-1-oic acid), N-methylserine, N,N-dimethylserine, 2-(methylamino)isobutyric acid, piperidine-2-carboxylic acid, N-methylpiperidine-2-carboxylic acid, β-amino acids such as 3-aminopropionic acid (β-alanine), 3-methylaminopropionic acid, 3-dimethylaminopropionic acid, iminodipropionic acid, N-methyliminodipropionic acid, piperidine-3-carboxylic acid, N-methylpiperidin-3-carboxylic acid, or aminocarboxylic acids such as piperidine-4-carboxylic acid, N-methylpiperidine-4-carboxylic acid, 4-aminobutyric acid, 4-methylaminobutyric acid, 4-dimethylaminobutyric acid, 6-aminohexanoic acid.

Suitable aminosulfonic acids are, for example, aminomethanesulfonic acid, taurine (2-aminoethanesulfonic acid), N-methyltaurine (2-(methylamino)ethanesulfonic acid).

When the aminocarboxylic acid or aminosulfonic acid has one or more chiral carbon atoms, the configuration is unimportant; it is possible to use either the pure enantiomers/diastereomers or any mixtures or racemates.

The aminocarboxylic acid is preferably an α-amino acid or a β-amino acid. The aminosulfonic acid is preferably an α-aminosulfonic acid or a β-aminosulfonic acid. Among these, α-amino acid and (β-aminosulfonic acid are particularly preferred. In agreement with the customary nomenclature, the designation "α" or "β" means that the amino group is separated from the carboxyl or sulfonic acid group, respectively, by one or two carbon atoms.

Particularly suitable are N-mono-$C_1$-$C_4$-alkylaminocarboxylic acids and N,N-di-$C_1$-$C_4$-alkylaminocarboxylic acids, especially N-mono-$C_1$-$C_4$-alkyl-α-aminocarboxylic acids and N,N-di-$C_1$-$C_4$-alkyl-α-aminocarboxylic acids. These include, for example, N,N-dimethylglycine or N-methylalanine.

Particularly suitable are also α-amino acids in which the α-carbon atom bears only substituents other than hydrogen, for example 2-aminoisobutyric acid.

The absorbent is preferably an aqueous solution. The absorbent may additionally comprise solvents which are, for example, selected from cyclotetramethylenesulfone (sulfolane) and derivatives thereof, aliphatic acid amides (acetylmorpholine, N-formylmorpholine), N-alkylated pyrrolidones and corresponding piperidones such as N-methylpyrrolidone (NMP), propylene carbonate, methanol, dialkyl ethers of polyethylene glycols and mixtures thereof.

The absorbent may comprise further functional constituents, such as corrosion inhibitors.

Where present, in the process according to the invention, not only carbon dioxide but typically also other acidic gases, for example $H_2S$, $SO_2$, $CS_2$, HCN, COS, $NO_2$, HCl, disulfides or mercaptans, are removed from the gas stream.

The process or absorbent according to the invention is suitable for treating fluids, especially gas streams of all types. Fluids which comprise the acidic gases are firstly gases such as natural gas, synthesis gas, coking oven gas, coal gasification gas, cycle gas, landfill gases and incineration gases, and secondly liquids essentially immiscible with the absorbent, such as LPG (liquefied petroleum gas) or NGL (natural gas liquids). The process or absorbent according to the invention is suitable for treating hydrocarbon-containing fluid streams. The hydrocarbons present are, for example, aliphatic hydrocarbons such as $C_1$-$C_4$-hydrocarbons such as methane, or aromatic hydrocarbons such as benzene, toluene or xylene.

The gas stream may also be a gas stream which is formed in the following way:
a) oxidation of organic substances, for example flue gases,
b) composting and storage of wastes comprising organic substances, or
c) bacterial decomposition of organic substances.

The oxidation can be performed with appearance of flame, i.e. as a conventional combustion, or as an oxidation without appearance of flame, for example in the form of a catalytic oxidation or partial oxidation. Organic substances which are subjected to incineration are typically fossil fuels such as coal, natural gas, mineral oil, gasoline, diesel, raffinates or kerosene, biodiesel or wastes having a content of organic substances. Starting materials of the catalytic (partial) oxidation are, for example, methanol or methane, which can be converted to formic acid or formaldehyde.

Waste substances which are subjected to oxidation, to composting or to storage are typically domestic refuse, plastic wastes or packaging refuse.

The organic substances are usually incinerated in customary incineration plants with air. Wastes comprising organic substances are generally composted and stored on refuse landfill sites. The offgas or the waste air of such sites can be treated advantageously by the process according to the invention.

The organic substances used for bacterial decomposition are typically stable manure, straw, liquid manure, sewage sludge, fermentation residues and the like. The bacterial decomposition is effected, for example, in customary biogas plants. The waste air of such plants can be treated advantageously by the process according to the invention.

The process is also suitable for treating the offgases of fuel cells or chemical synthesis plants which serve for a (partial) oxidation of organic substances.

In addition, the process according to the invention may of course also be employed in order to treat uncombusted fossil gases, such as natural gas, for example so-called coal-seam gases, i.e. gases which arise in the extraction of coal; which are collected and compressed.

The invention will be illustrated in detail with reference to the appended figures and to the examples which follow.

Figure 2:
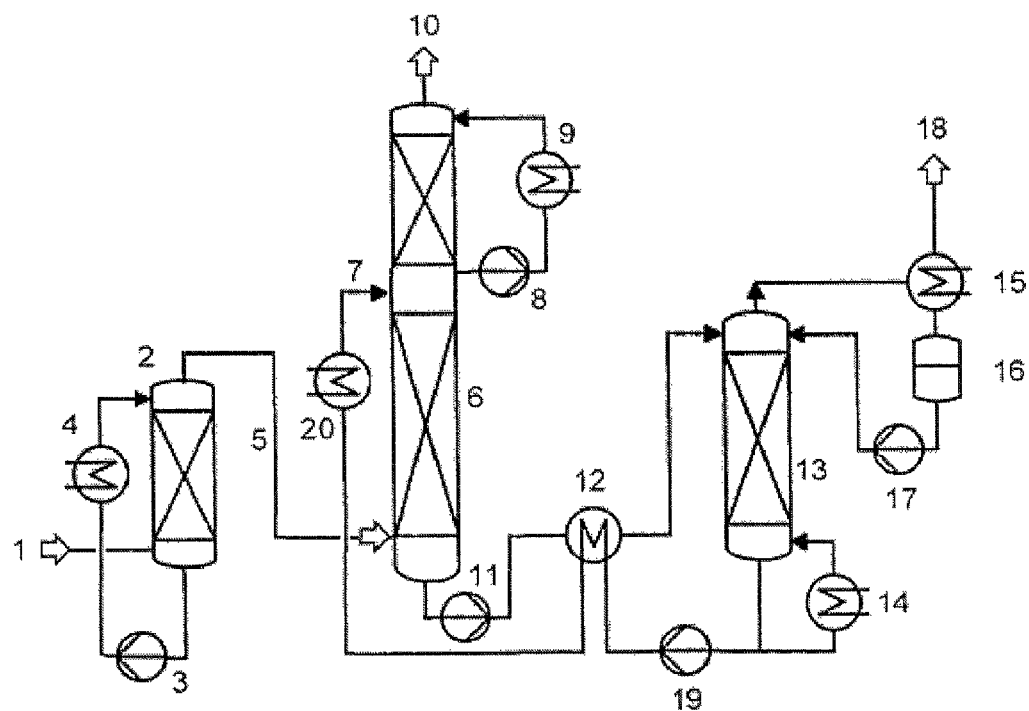
FIG. 2 shows a schematic of an apparatus for performing the process according to the invention, as is suitable for the inventive treatment of a flue gas.

According to FIG. 2, a carbon dioxide-comprising flue gas is introduced via a feed line 1 into the gas scrubber 2 and cooled there in direct contact with quench water, which is pumped in circulation through the pump 3 and the heat exchanger 4. The cooled flue gas is introduced via line 5 into an absorber 6 and contacted in countercurrent with the regenerated absorbent, which is introduced via the absorbent line 7. The absorbent removes carbon dioxide by absorption from the gas. In the upper part of the absorber 6, a rescrubbing section is provided, which consists of internals such as structured packings, random packings or trays, the pump 8 and the heat exchanger 9. Water or condensate is recycled via the pump 8 and the heat exchanger 9 in order to scrub entrained ammonia out of the treated gas stream; at the offgas line 10, a treated gas low in carbon dioxide is obtained.

The carbon dioxide-laden absorbent is fed to a desorption column 13 via a pump 11 and a heat exchanger 12 in which the absorbent laden with is heated with the heat from the regenerated absorbent emerging from the bottom of the desorption column 13. In the lower part of the desorption column 13, the laden absorbent is heated by means of a heater 14 and regenerated. The carbon dioxide released leaves the desorption column 13 via the offgas line 18. In the line 18, a condenser 15 with reflux vessel 16 is provided, in order to condense out entrained absorbent vapors. The regenerated absorbent is then fed back to the absorption column 6 by means of a pump 19 via the heat exchanger 12, in which the regenerated absorbent heats the laden absorbent and is itself cooled at the same time, and a heat exchanger 20.

EXAMPLE 1

Comparative $CO_2$ Absorption Capacity of an Aqueous Ammonia Solution

The typical $CO_2$ content of the flue gas of a coal-fired power station is about 14% by volume. It is assumed that the absorption proceeds at 10° C. and a total pressure of 1 bar, corresponding to a partial $CO_2$ pressure of about 0.14 bar. For the regeneration, it is assumed that a total pressure of 10 bar and a temperature of 120° C. are present in the desorber bottom.

Equilibrium measurements were conducted at 10° C. and 120° C. in a glass pressure vessel (volume about 100 cm$^3$). The vessel was initially charged with a particular amount of water which was degassed by applying a vacuum. After evacuation, a defined amount of ammonia was added, so as to obtain a solution with 5.3% ammonia. After the temperature had been set to 10° C., carbon dioxide was metered in stepwise via a defined gas volume. After the equilibrium had been established, the total pressure in the vessel was determined.

Figure 1:
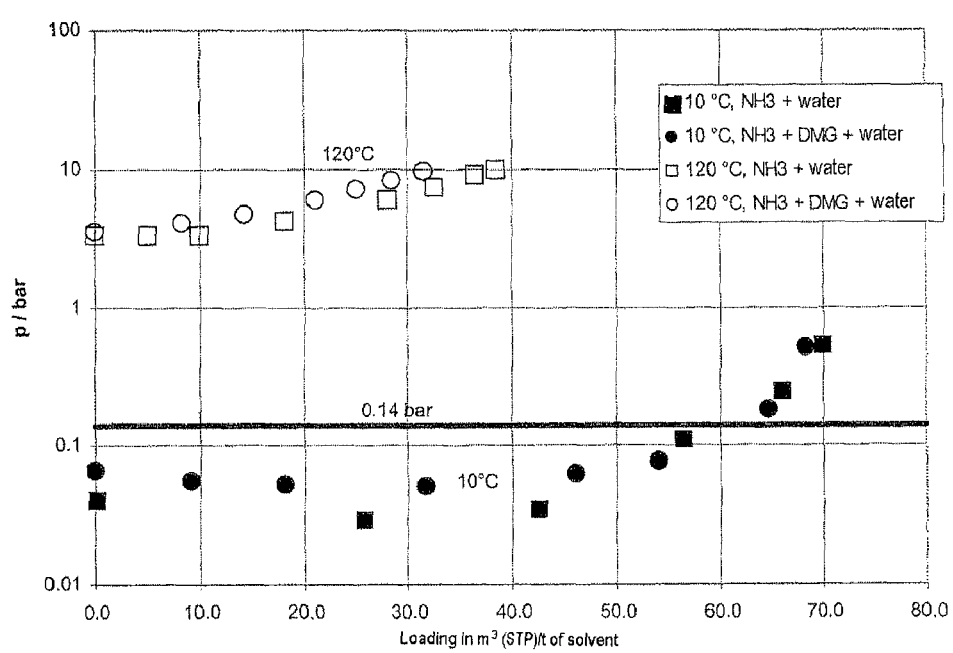
FIG. 1 shows the equilibrium loading as a function of pressure of an aqueous ammonia solution (comparative) and of an aqueous solution of ammonia and dimethylglycine (inventive) at 10° C. and 120° C.

In the same manner, the total pressure of a 5.3% by weight ammonia solution was also determined as a function of the amount of $CO_2$ added at 120° C. The results are shown in FIG. 1 (the loadings of the aqueous solution in m$^3$ (STP)/t of solution were calculated neglecting the mass of the gas phase).

The equilibrium loading (maximum loadability) of the ammonia solution with $CO_2$ at 0.14 bar and 10° C. can be determined as the point of intersection of the pressure loading curve (10° C.) with the straight line at p=0.14 bar (about 64 m$^3$ (STP)/t). For the regeneration, the equilibrium loading (residual loading of the regenerated absorbent) is found as the point of intersection of the pressure-loading curve (120° C.) with the straight line at p=10 bar (approx. 38.5 m$^3$ (STP)/t). The difference between the two loadings gives a cycle capacity of 25.5 m$^3$ (STP)/t.

EXAMPLE 2

$CO_2$ Absorption Capacity of an Aqueous Ammonia Solution with Dimethylglycine

In the same manner as described above, for an aqueous solution of 5% by weight of ammonia and 30% by weight of dimethylglycine, the total pressure above the solution was determined at 10° C. and 120° C., and pressure-loading curves were established (FIG. 1). The evaluation gives a maximum loadability at 0.14 bar and 10° C. of about 64 m$^3$ (STP)/t. Under the conditions in the desorber, an equilibrium loading of 32.8 m$^3$ (STP)/t is found. The cycle capacity for these absorbents is thus 31.2 m$^3$ (STP)/t.

The comparison between the two examples shows that addition of dimethylglycine to the ammonia solution increases the cycle capacity by the factor of 1.22. A large capacity means that less solvent has to be circulated and hence the apparatus, for example pumps, heat exchangers, but also the pipelines, can be designed with smaller dimensions. In the present example, it would be possible to reduce the amount circulated by about 18%.

The invention claimed is:

1. A process for removing carbon dioxide from a fluid stream, in which
   a) the fluid stream is contacted with an absorbent which comprises a solution of ammonia and at least one or both of an aminocarboxylic acid and an aminosulfonic acid to obtain a laden absorbent, wherein the absorbent has a molar ratio of ammonia to the at least one or both of the aminocarboxylic acid and the aminosulfonic acid of from 0.5 to 6; and
   b) the laden absorbent is regenerated with release of carbon dioxide.

2. The process according to claim 1, wherein the fluid stream is cooled before being contacted with the absorbent.

3. The process according to claim 2, wherein the fluid stream is cooled to a temperature of from 0 to 20° C.

4. The process according to claim 1, wherein the fluid stream is contacted with the absorbent at a temperature of from 0 to 20° C.

5. The process according to claim 1, wherein the fluid stream is contacted with the absorbent at a pressure of from 0.9 to 3 bar (absolute pressure).

6. The process according to claim 1, wherein the laden absorbent is regenerated at a temperature of from 50 to 200° C.

7. The process according to claim 1, wherein the laden absorbent is regenerated at a pressure of from 5 to 50 bar (absolute pressure).

8. The process according to claim 1, wherein the absorbent has an ammonia concentration of from 1 to 12 mol/l.

9. The process according to claim 1, wherein the regenerated absorbent has a molar ratio of ammonia:carbon dioxide of more than 1.5.

10. The process according to claim 1, wherein the laden absorbent has a molar ratio of ammonia:carbon dioxide of from 1.0 to 2.0.

11. The process according to claim 1, wherein the aminocarboxylic acid is an α-amino acid or a β-amino acid.

12. The process according to claim 1, wherein the aminocarboxylic acid is selected from N-mono-$C_1$-$C_4$-alkylaminocarboxylic acids and N,N-di-$C_1$-$C_4$-alkylaminocarboxylic acids.

13. The process according to claim 1, wherein the aminocarboxylic acid is any one or a combination selected from the group consisting of: 2-aminoacetic acid, 2-aminopropionic acid, N-methylalanine, N-methylglycine, 2-aminoisobutyric acid, piperidine-4-carboxylic acid, piperidine-3-carboxylic acid, piperidine-2-carboxylic acid, 2-amino-3-methylbutyric acid, 2-amino-4-methylpentanoic acid, 2-amino-3-methylpentanoic acid, N-methylaminoisobutyric acid, β-aminobutyric acid, 3-aminopropionic acid, 2-amino-4-methylsulfanylbutanoic acid, 2-aminoethanesulfonic acid and 2-(methylamino)ethanesulfonic acid.

14. The process according to claim 1, wherein the fluid stream is a combustion offgas.

* * * * *